(12) United States Patent
Lee et al.

(10) Patent No.: US 12,257,937 B2
(45) Date of Patent: Mar. 25, 2025

(54) DOOR ARMREST STRUCTURE OF VEHICLE

(71) Applicants: Hyundai Motor Company, Seoul (KR); Kia Corporation, Seoul (KR); Duckyang Ind. Co., Ltd., Ulsan (KR)

(72) Inventors: Jaeseung Lee, Hwaseong-si (KR); Dowon Kim, Seoul (KR); Yonghyun Nam, Anyang-si (KR); Kyuhoon Cho, Suwon-si (KR); Dae Hee Lee, Incheon (KR); Soo Bok Kim, Incheon (KR); Chungsik Yim, Anyang-si (KR); Kwang Seub Kim, Suwon-si (KR)

(73) Assignees: Hyundai Motor Company, Seoul (KR); Kia Corporation, Seoul (KR); Duckyang Ind. Co., Ltd., Ulsan (KR)

( * ) Notice: Subject to any disclaimer, the term of this patent is extended or adjusted under 35 U.S.C. 154(b) by 370 days.

(21) Appl. No.: 17/979,613

(22) Filed: Nov. 2, 2022

(65) Prior Publication Data
US 2023/0234486 A1     Jul. 27, 2023

(30) Foreign Application Priority Data
Jan. 27, 2022   (KR) .................. 10-2022-0012235

(51) Int. Cl.
*B60N 2/75*      (2018.01)
*B60R 13/02*     (2006.01)
*B60R 16/023*    (2006.01)
*E05B 81/12*     (2014.01)
*B60J 5/04*      (2006.01)
(Continued)

(52) U.S. Cl.
CPC .............. *B60N 2/78* (2018.02); *B60N 2/767* (2018.02); *B60R 13/0243* (2013.01); *B60R 16/023* (2013.01); *E05B 81/13* (2013.01); *B60J 5/0416* (2013.01); *B60J 5/047* (2013.01); *B60N 2/02246* (2023.08); *B60N 2/753* (2018.02); *B60R 2011/0021* (2013.01); (Continued)

(58) Field of Classification Search
CPC ...... B60N 2/78; B60N 2/767; B60N 2/02246; B60N 2/753; B60R 13/0243; B60R 16/023; B60R 11/00; B60R 13/02; B60R 2011/0021; B60R 2011/0085; B60R 2011/0092; E05B 81/13; B60J 5/0416; B60J 5/047
USPC .......................... 296/1.09, 153, 155
See application file for complete search history.

(56) References Cited

U.S. PATENT DOCUMENTS 5,816,645 A * 10/1998 Grimes .................. B60N 2/914
                                                          296/153
5,967,594 A * 10/1999 Ramanujam ............. B60N 2/78
                                                          280/751

* cited by examiner

*Primary Examiner* — Amy R Weisberg
*Assistant Examiner* — Dana D Ivey
(74) *Attorney, Agent, or Firm* — Morgan, Lewis & Bockius LLP

(57) ABSTRACT

A door armrest structure of a vehicle includes: an armrest pivot including a first end portion rotatably coupled to the door internal panel, and a second end portion extending into the vehicle body through the door trim; an armrest including a first end portion connected to the second end portion of the armrest pivot and operating to be rotated according to rotation of the armrest pivot; a drive motor connected to the armrest pivot and operating to rotate the armrest pivot according to an opening signal or a closing signal of the door; and a supporting pin that supports the second end portion of the armrest to be fixed when the armrest rotates and forms an angle which is parallel to a bottom surface of the vehicle body.

16 Claims, 14 Drawing Sheets

(51) Int. Cl.
*B60N 2/02* (2006.01)
*B60R 11/00* (2006.01)
(52) U.S. Cl.
CPC ................ *B60R 2011/0085* (2013.01); *B60R 2011/0092* (2013.01); *B60R 13/02* (2013.01)

DOOR ARMREST STRUCTURE OF VEHICLE

CROSS-REFERENCE TO RELATED APPLICATION

The present application claims priority to Korean Patent Application No. 10-2022-0012235 filed on Jan. 27, 2022, the entire contents of which is incorporated herein for all purposes by this reference.

BACKGROUND OF THE PRESENT DISCLOSURE

Field of the Present Disclosure

The present disclosure relates to a door armrest structure of a vehicle. More particularly, the present disclosure relates to a door armrest structure capable of supporting an arm of an occupant inside a vehicle having a sliding door structure.

Description of Related Art

In general, a vehicle has a vehicle compartment having a predetermined size capable of accommodating a driver and a fellow rider, and a vehicle compartment opening/closing door is provided in the vehicle body to open or close the vehicle compartment.

In the case of a passenger vehicle, the vehicle compartment opening/closing door includes a front door provided in the front in the longitudinal direction of the vehicle and a rear door provided in the rear in the longitudinal direction of the vehicle, and the front door and the rear door are usually rotatably provided in the vehicle body by hinges.

In the case of a van which may accommodate many people, the vehicle compartment opening/closing door slides back and forth in the longitudinal direction of the vehicle to open or close the vehicle compartment.

In the sliding-type vehicle compartment opening/closing door of the van, the vehicle compartment opening/closing door moves rearward in the longitudinal direction of the vehicle to open the vehicle compartment, and moves forward in the longitudinal direction of the vehicle to close the vehicle compartment. Therefore, it is advantageous in that the opening/closing space required for opening and closing the door is smaller than that of the hinge-type vehicle compartment opening/closing door such as the passenger vehicle, and the door opening formed in the vehicle body may be completely opened even in a narrow opening/closing space.

On the other hand, the door of the vehicle is provided with a door armrest for supporting the arm of the occupant. However, as shown in FIG. 1, in the vehicle having sliding compartment opening/closing doors 2 and 3 on a vehicle body 1, it is difficult to secure the space occupied by the door armrest on the rear door 3 side to secure the swing gap G.

FIG. 2 is an enlarged view showing a part 'A', which is a vehicle hinge coupling part of FIG. 1, and FIG. 3 is a cross-sectional view cut along a line 'B-B' of FIG. 2.

As shown in FIG. 2 and FIG. 3, in a case of the hinge-type compartment opening/closing door, in the space between the rear door 3 and the luggage trim 5, as there is no choice but to reduce an existing armrest length space to produce a smaller length space to avoid interference when opening the door, the space is reduced by an 'L' length compared to an existing one. In the instant case, there is a problem that usability deteriorates because it is difficult for the occupant to secure an armrest space to support the arm.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an active door armrest structure which may function as an armrest as a position is changed according to the opening/closing of the door in the hinge-type compartment opening/closing door.

A door armrest structure of a vehicle according to various exemplary embodiments of the present disclosure as a door armrest structure of a vehicle as a door armrest structure provided to a door internal panel configuring a door for opening or closing a door opening formed in a vehicle body and a door trim covering the door internal panel, includes: an armrest pivot including a first end portion rotatably coupled to the door internal panel, and a second end portion extending into the vehicle body through the door trim; an armrest including a first end portion connected to the second end portion of the armrest pivot and operating to be rotated according to rotation of the armrest pivot; a drive motor connected to the armrest pivot and operating to rotate the armrest pivot according to an opening/closing signal of the door; and a supporting pin that supports the second end portion of the armrest to be fixed when the armrest rotates and forms an angle which is parallel to a bottom surface of the vehicle body.

The supporting pin may be provided on a rear luggage trim of the vehicle body.

The other end portion of the armrest may be provided with a fixing protrusion supported to the supporting pin.

One end portion of the armrest pivot may be rotatably coupled to the door internal panel by an armrest pivot fixing pin.

In the opening/closing process of the door, the armrest may be rotated so that the second end portion of the armrest is disposed to be rotated in a direction away from the bottom surface of the vehicle body.

The armrest may function as a grip handle when the armrest is rotated and the second end portion of the armrest is disposed to be rotated in a direction away from the bottom surface of the vehicle body.

The door trim may have an armrest seating portion that provides a rotation space for the armrest at a connection point of the armrest pivot and the armrest.

When the armrest rotates and the second end portion of the armrest rotates in a direction away from the bottom surface of the vehicle body, the armrest seating portion may be formed with a cutting portion that limits the rotation of the armrest.

In the closing state of the door, the armrest may rotate so that the other end portion of the armrest may be supported to the supporting pin.

When the armrest is rotated and the other end portion of the armrest is supported to the supporting pin, the armrest may function to mount the arm of the occupant.

The upper surface of the armrest may be disposed to be a same surface as an external upper surface of the armrest seating portion.

The end portion of the armrest may be formed of a 'L' shape.

The drive motor may be a cinching motor that assists in locking of the door and the rotation of the armrest.

The drive motor may include a latch driving cable and an armrest driving cable respectively connected to a latch provided on the hinge side of the door and the armrest pivot to transmit a driving torque to the latch and the armrest pivot.

According to various exemplary embodiments of the present disclosure, by providing the active door armrest structure that functions as the grip handle in the door opening/closing process in the hinge-type vehicle compartment opening/closing door, and functions as the armrest when the door is closed, the usability may be greatly improved.

Furthermore, it is possible to prevent the interference in the sliding opening/closing process of the door from occurring while solving the difficult problem of securing the space occupied by the door armrest on the rear door side, reducing the cost and improving a freedom degree of the layout.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
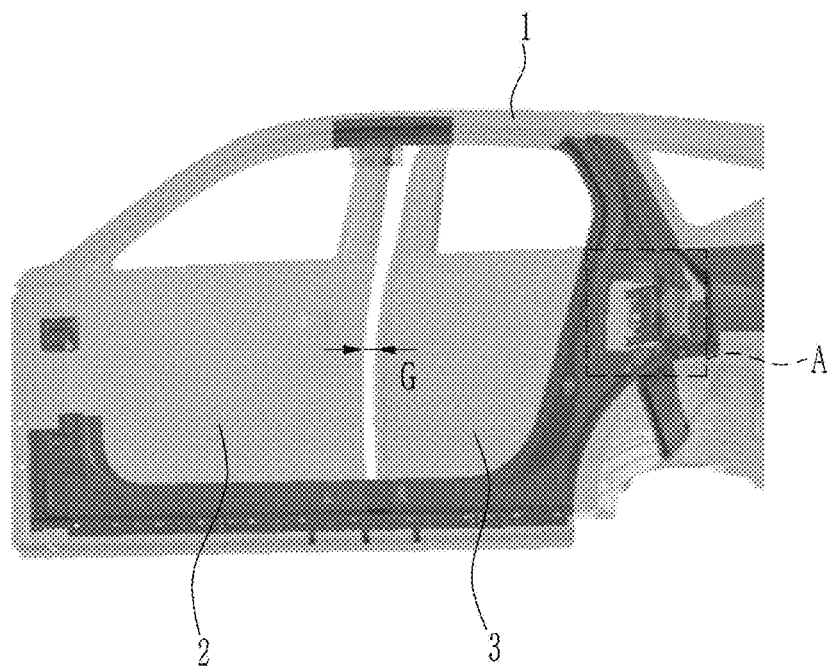
FIG. 1 is a side view showing a vehicle having a conventional sliding compartment opening/closing door.
Figure 2:
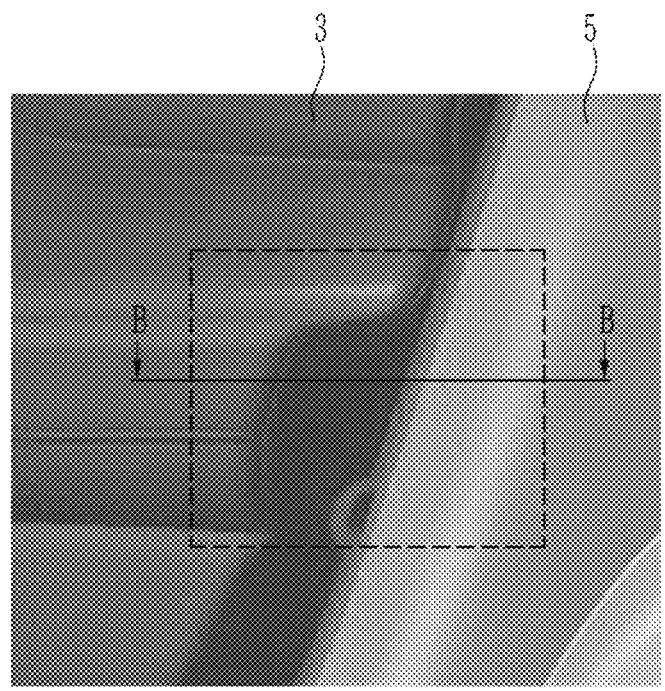
FIG. 2 is an enlarged view showing a part 'A' part, which is a vehicle hinge coupling part of FIG. 1.
Figure 3:
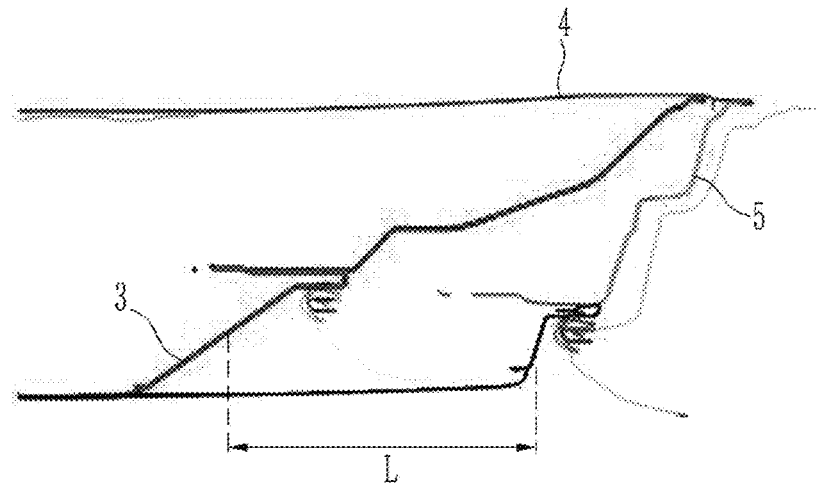
FIG. 3 is a cross-sectional view taken along a line 'B-B' of FIG. 2.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, with reference to the accompanying drawings, embodiments of the present disclosure will be described in detail so that a person of ordinary skill in the art to which an exemplary embodiment of the present disclosure pertains can easily implement the same. As those skilled in the art would realize, the described embodiments may be modified in various different ways, all without departing from the spirit or scope of the present disclosure.

Furthermore, in embodiments, since like reference numerals designate like elements having the same configuration, various exemplary embodiments are representatively described, and in other exemplary embodiments of the present disclosure, only configurations that are different from the various exemplary embodiments will be described.

The drawings are schematic, and are not illustrated in accordance with a scale. Relative dimensions and ratios of portions in the drawings are illustrated to be exaggerated or reduced in size for clarity and convenience, and the dimensions are just examples and are not limiting. In addition, like structures, elements, or components illustrated in two or more drawings use the same reference numerals for showing similar features. It will be understood that when an element such as a layer, film, region, or substrate is referred to as being "on" another element, it can be directly on the other element or intervening elements may also be present.

Various exemplary embodiments of the present disclosure represents various exemplary embodiments of the present disclosure in detail. As a result, various modifications of the drawings will be expected. Therefore, the exemplary embodiment of the present disclosure is not limited to a specific aspect of the illustrated region, and for example, includes modifications of an aspect by manufacturing.

Now, a door armrest structure of a vehicle according to various exemplary embodiments of the present disclosure will be described with reference to appended drawings.

Figure 4:
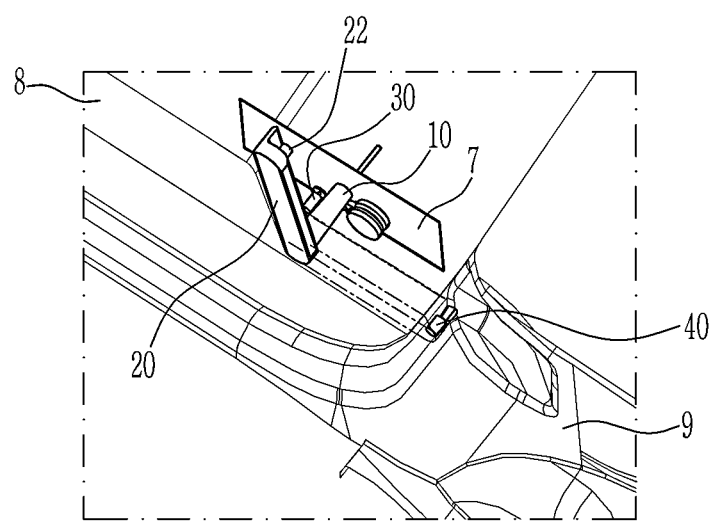
FIG. 4 is a view showing a shape viewing a door armrest structure of a vehicle according to various exemplary embodiments of the present disclosure from an upper side thereof.

FIG. 4 is a view showing a shape of a door armrest structure of a vehicle according to various exemplary embodiments of the present disclosure from an upper side thereof.

Referring to FIG. 4, the door armrest structure of the vehicle according to various exemplary embodiments of the present disclosure may be applied to the internal side of the rear door provided at the rear in the longitudinal direction of the vehicle, and may be applied to the structure in which the rear door is opened or closed by the movement in the inside and outside directions of the vehicle and the forwards and backwards sliding movement in the longitudinal direction of the vehicle. Furthermore, the door armrest structure of the vehicle according to various exemplary embodiments of the present disclosure may be provided over a door internal panel 7 forming the rear door for opening/closing the door opening formed on the vehicle body and a door trim 8 covering the door internal panel 7.

Referring to FIG. 4, the door armrest structure of the vehicle according to various exemplary embodiments of the present disclosure includes an armrest pivot 10, an armrest 20, a drive motor 30, and a supporting pin 40.

As for the armrest pivot 10, one end portion thereof is rotatably coupled to the door internal panel 7, and the other end portion thereof extends into the interior of the vehicle body through the door trim 8. One end portion of the armrest pivot 10 is provided at an angle which is approximately perpendicular to the door internal panel 7 by the armrest pivot fixing pin 24, and the armrest pivot 10 may be rotated around the armrest pivot fixing pin 24. The other end portion of the armrest pivot 10 extends through the door trim 8 into the side of the vehicle body.

The armrest 20 is connected to the other end portion of the armrest pivot 10 at an angle which is approximately perpendicular to the armrest pivot 10 and is provided to rotate according to the rotation of the armrest pivot 10.

The drive motor 30 is connected to the armrest pivot 10 and operates to rotate the armrest pivot 10 according to an opening signal or a closing signal of the door.

The supporting pin 40 supports the other end portion of the armrest 20 to be fixed when the armrest 20 rotates to form an angle which is approximately parallel to the bottom surface of the vehicle body. That is, the armrest 20 is rotated by the rotation of the armrest pivot 10 so that the other end portion of the armrest 20 is disposed toward the rear side of the vehicle body, and at the instant time, the other end portion of the armrest 20 is supported and fixed to the supporting pin 40.

The supporting pin 40 may be provided in luggage trim 9 at the rear of the vehicle body. Furthermore, the other end portion of the armrest 20 may be provided with a fixing protrusion 22 in which the other end portion of the armrest 20 is supported by the supporting pin 40.

Figure 5:
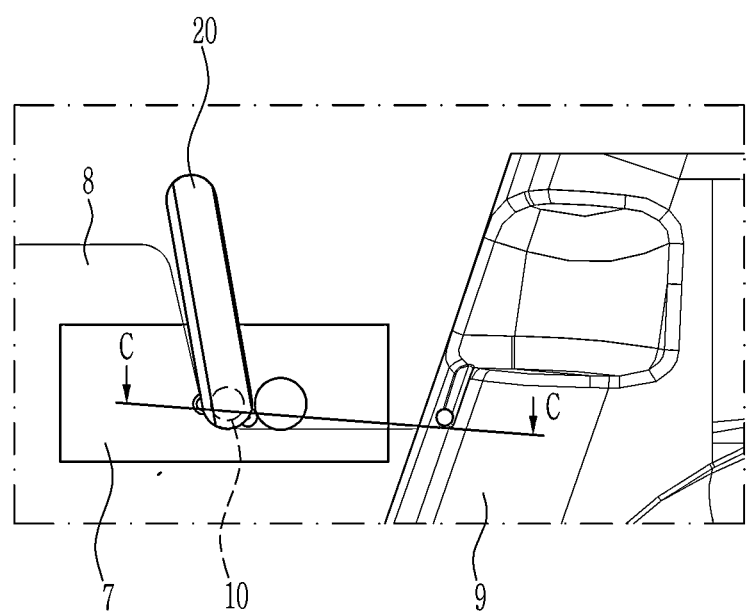
FIG. 5 is a view showing a shape viewing a shape of a position state of an armrest in a door opening/closing process of a door armrest structure of a vehicle according to various exemplary embodiments of the present disclosure from a front.
Figure 6:
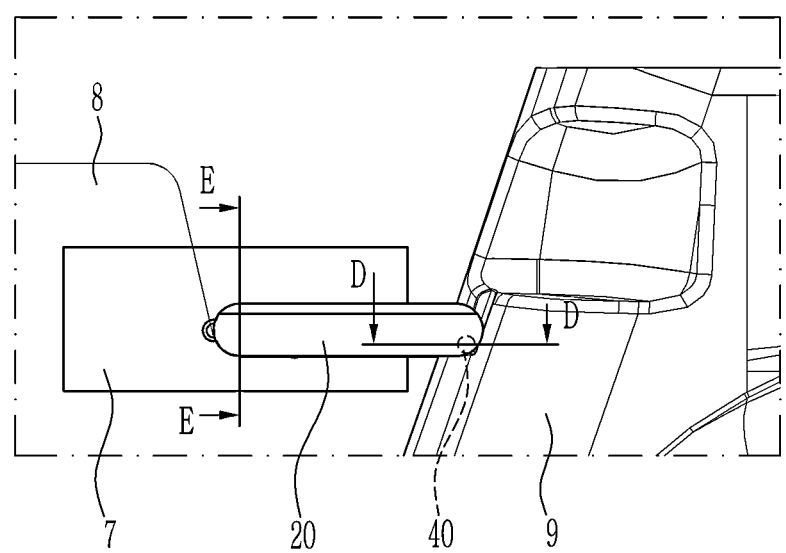
FIG. 6 is a view showing a shape of a position state of an armrest in a door closing state of a door armrest structure of a vehicle according to various exemplary embodiments of the present disclosure.

FIG. 5 is a view showing a shape of a position state of an armrest in a door opening/closing process of a door armrest structure of a vehicle according to various exemplary embodiments of the present disclosure from a front, and FIG. 6 is a view showing a shape of a position state of an armrest in a door closing state of a door armrest structure of a vehicle according to various exemplary embodiments of the present disclosure.

As shown in FIG. 5, in the opening/closing process of the door, the armrest 20 may be rotated so that the other end portion of the armrest 20 may be disposed to be rotated in a direction away from the bottom surface of the vehicle body. That is, during the operation process in which the door is opened or closed, the armrest 20 is rotated so that the position state is changed to be disposed in the vertical direction on the bottom surface of the vehicle body, interference does not occur during the opening/closing process of the door by the armrest 20. Furthermore, in a state in which the armrest 20 is rotated so that the armrest 20 is disposed in the vertical direction on the bottom surface of the vehicle body, the armrest 20 may function as a grip handle.

Also, as shown in FIG. 6, in a state that the door is closed, the armrest 20 is rotated so that the other end portion of the armrest 20 may be supported to the supporting pin 40. When the armrest 20 is rotated and the other end portion of the armrest 20 is supported to the supporting pin 40, the armrest 20 may function to mount the arm of the occupant.

Figure 7:
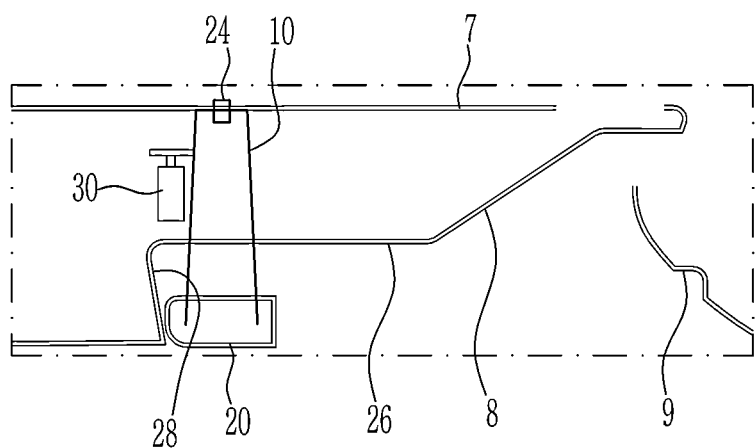
FIG. 7 is a cross-sectional view taken along a line 'C-C' of FIG. 5.

FIG. 7 is a cross-sectional view taken along a line 'C-C' of FIG. 5.

Referring to FIG. 7, the drive motor 30 is connected to the side portion of the armrest pivot 10 and is driven to be rotated according to an opening signal or a closing signal of the door, rotating the armrest pivot 10. The armrest pivot 10 rotates around the armrest pivot fixing pin 24 provided in the door internal panel 7, and in the door opening/closing process, the armrest 20 connected to the other end portion of the armrest pivot 10 may be in contact with the cutting portion 28 of the door trim 8. The cutting portion 28 limits the rotation of the armrest 20 toward the front of the vehicle when the armrest 20 rotates and the other end portion of the armrest 20 rotates in a direction away from the bottom surface of the vehicle body.

Figure 8:
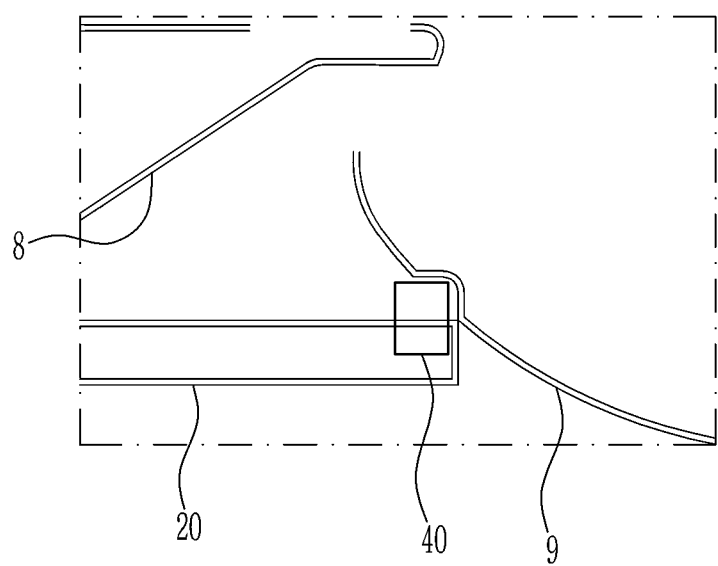
FIG. 8 is a cross-sectional view taken along a line 'D-D' of FIG. 6.

FIG. 8 is a cross-sectional view taken along a line 'D-D' of FIG. 6.

Referring to FIG. 8, in the door closing state, the armrest 20 is rotated so that the other end portion of the armrest 20 is supported to the supporting pin 40. The supporting pin 40 is provided in the luggage trim 9 at the rear of the vehicle body, and the fixing protrusion 22 provided at the other end portion of the armrest 20 is supported in contact with the supporting pin 40.

Figure 9:
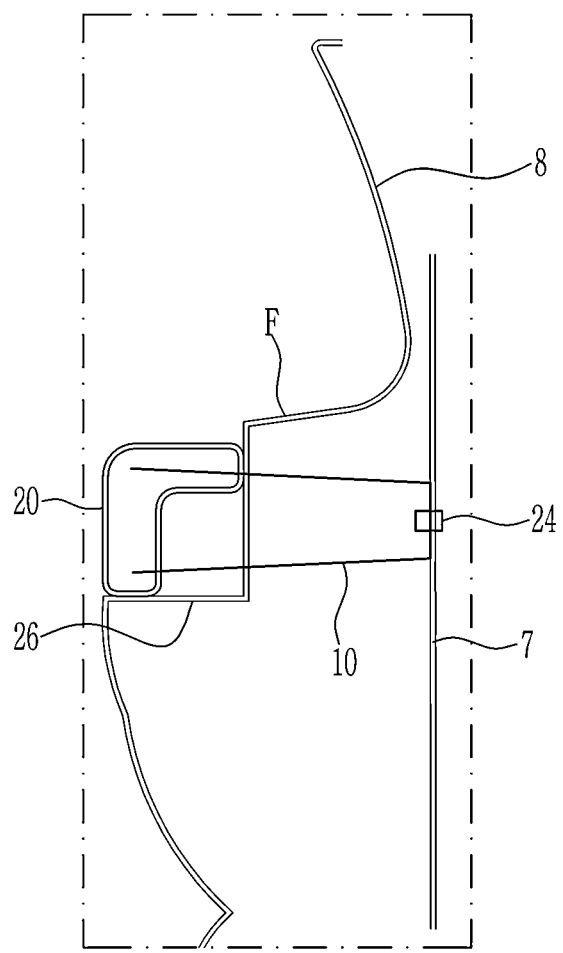
FIG. 9 is a cross-sectional view taken along a line 'E-E' of FIG. 6.

FIG. 9 is a cross-sectional view taken along a line 'E-E' of FIG. 6.

Referring to FIG. 9, in the door closing state, the armrest 20 may be mounted on the armrest seating portion 26. The armrest seating portion 26 may provide a rotation space for the armrest 20 at the connection portion between the armrest pivot 10 and the armrest 20. The armrest seating portion 26 may be formed to extend in the longitudinal direction of the vehicle body.

The upper surface of the armrest 20 may be disposed to be substantially flush with the external upper surface of the armrest seating portion 26, and the end portion of the armrest 20 may be formed in an 'L' shape. By setting the upper surface of armrest 20 into the surface including the same angle as the external upper surface of the armrest seating portion 26, external aesthetics and usability may be improved, and by setting the end portion of armrest 20 into the 'L' shape, the supporting role of the armrest 20 may be maximized.

FIG. 10A, FIG. 10B, FIG. 10C, and FIG. 10D are views sequentially showing a change from a door closing state to a door opening state of a door armrest structure of a vehicle according to various exemplary embodiments of the present disclosure.

Figure 10A:
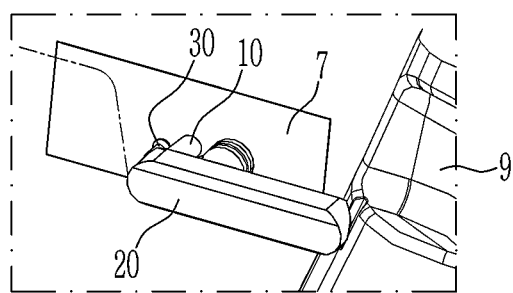
FIG. 10A, FIG. 10B, FIG. 10C, and FIG. 10D are views sequentially showing a change from a door closing state to a door opening state of a door armrest structure of a vehicle according to various exemplary embodiments of the present disclosure.
Figure 10B:
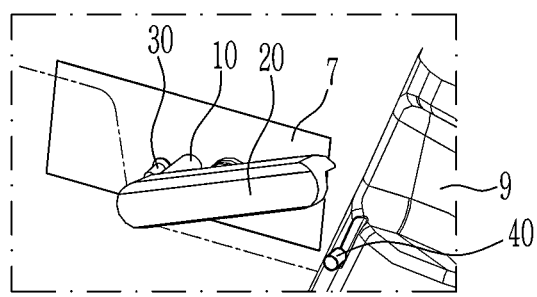
Figure 10C:
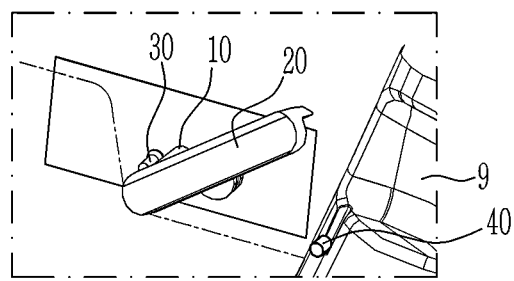
Figure 10D:
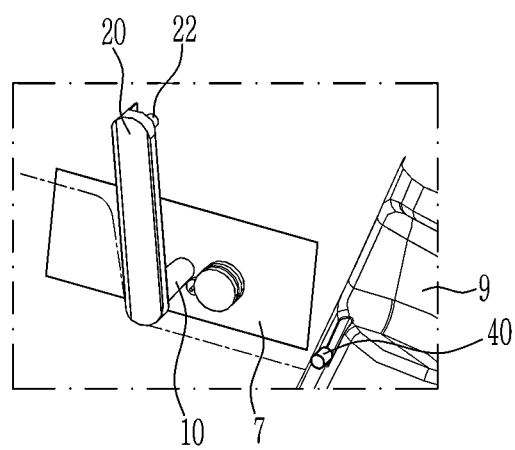

Referring to FIG. 10A, FIG. 10B, FIG. 10C, and FIG. 10D, in the door closing state in FIG. 10A, the other end portion of the armrest 20 is supported by the supporting pin 40, and the armrest 20 is disposed at an angle approximately parallel to the bottom surface of the vehicle body. If the door open signal is input, the drive motor 30 is operated to rotate the armrest pivot 10 and the armrest 20 starts to be rotated in a direction in which the other end portion of the armrest 20 is away from the bottom surface of the vehicle body in FIG. 10B. As the rotation of the armrest 20 proceeds further, first stage opening of the rear door begins in FIG. 10C. After that, the armrest 20 rotates and the side of the armrest 20 is in contact with the cutting portion 28 formed in the armrest seating portion 26, and the first stage opening of the rear door is finished in FIG. 10D. After this, the rear door is fully opened by the swing.

On the other hand, the change from the door open state to the door closing state is the same as the reverse order of the process shown in FIG. 10 so that the detailed description is omitted below.

Figure 11:
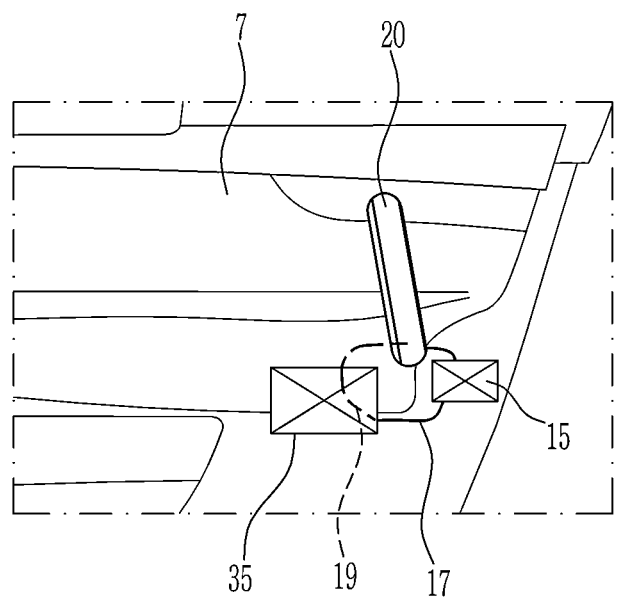
FIG. 11 is a view showing an exemplary embodiment including a cinching motor of a door armrest structure of a vehicle according to various exemplary embodiments of the present disclosure.

FIG. 11 is a view showing an exemplary embodiment including a cinching motor of a door armrest structure of a vehicle according to various exemplary embodiments of the present disclosure.

Referring to FIG. 11, the drive motor 30 according to various exemplary embodiments of the present disclosure may be a cinching motor 35 that assists a locking of the door and the rotation of the armrest 20. The cinching motor 35 supplements the door closing by providing more torque when the door is not completely closed during the closing. Furthermore, by rotating the armrest 20 in a state in which the door is closed, it is possible to assist in performing the function of mounting the arm of the occupant of the armrest 20. Furthermore, when the door is opened, the armrest 20 may be rotated to provide torque to function as a grip handle.

The cinching motor 35 may include a latch driving cable 17 and an armrest driving cable 19 respectively connected to the latch 15 and the armrest pivot 10 to transmit a driving torque to the latch 15 and the armrest pivot 10 provided on the hinge side of the door. The latch driving cable 17 may transmit the power of the cinching motor 35 to the latch 15, and the armrest driving cable 19 may transfer the power of the cinching motor 35 to the armrest 20.

In an exemplary embodiment of the present invention, a controller is electrically connected to the drive motor 30 or the cinching motor 35 and configured to rotate the armrest pivot 10 by the drive motor 30 or the cinching motor 35 according to an opening signal or a closing signal of the door.

Accordingly, according to various exemplary embodiments of the present disclosure, by providing the active door armrest structure that functions as the grip handle in the door opening/closing process in the hinge-type vehicle compartment opening/closing door, and functions as the armrest when the door is closed, the usability may be greatly improved.

Furthermore, it is possible to prevent the interference in the sliding opening/closing process of the door from occurring while solving the difficult problem of securing the space occupied by the door armrest on the rear door side, reducing the cost and improving a freedom degree of the layout.

In addition, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method disclosed in the aforementioned various exemplary embodiments of the present invention.

The aforementioned invention can also be embodied as computer readable codes on a computer readable recording medium. The computer readable recording medium is any data storage device that can store data which can be thereafter read by a computer system and store and execute program instructions which can be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc. and implementation as carrier waves (e.g., transmission over the Internet). Examples of the program instruction include machine language code such as those generated by a compiler, as well as high-level language code that may be executed by a computer using an interpreter or the like.

In an exemplary embodiment of the present invention, each operation described above may be performed by a control device, and the control device may be configured by multiple control devices, or an integrated single control device.

In an exemplary embodiment of the present invention, the control device may be implemented in a form of hardware or software, or may be implemented in a combination of hardware and software.

In addition, the terms such as "unit", "module", etc. disclosed in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A door armrest structure of a vehicle as a door armrest structure provided to a door internal panel configuring a door for opening or closing a door opening formed in a vehicle body and a door trim covering the door internal panel, the door armrest structure comprising:
- an armrest pivot including a first end portion rotatably coupled to the door internal panel, and a second end portion extending into the vehicle body through the door trim;
- an armrest including a first end portion connected to the second end portion of the armrest pivot and operating to be rotated according to rotation of the armrest pivot;
- a drive motor connected to the armrest pivot and operating to rotate the armrest pivot according to an opening signal or a closing signal of the door; and
- a supporting pin that supports the second end portion of the armrest to be fixed when the armrest rotates and forms an angle which is parallel to a bottom surface of the vehicle body.

2. The door armrest structure of claim 1, wherein the supporting pin is provided on a rear luggage trim of the vehicle body.

3. The door armrest structure of claim 1, wherein the second end portion of the armrest is provided with a fixing protrusion supported to the supporting pin.

4. The door armrest structure of claim 1, wherein the first end portion of the armrest pivot is rotatably coupled to the door internal panel by an armrest pivot fixing pin.

5. The door armrest structure of claim 1, wherein in an opening process or a closing process of the door, the armrest is rotated so that the second end portion of the armrest is disposed to be rotated in a direction away from the bottom surface of the vehicle body.

6. The door armrest structure of claim 5, wherein the armrest is configured as a grip handle when the armrest is rotated and the second end portion of the armrest is disposed to be rotated in a direction away from the bottom surface of the vehicle body.

7. The door armrest structure of claim 1, wherein the door trim has an armrest seating portion that provides a rotation space for the armrest at a connection point of the armrest pivot and the armrest.

8. The door armrest structure of claim 7,
wherein the armrest seating portion includes a cutting portion, and
wherein when the armrest rotates and the second end portion of the armrest rotates in a direction away from the bottom surface of the vehicle body, the cutting portion of the armrest seating portion limits rotation of the armrest.

9. The door armrest structure of claim 1, wherein in a closing state of the door, the armrest rotates so that the second end portion of the armrest is supported to the supporting pin.

10. The door armrest structure of claim 9, wherein when the armrest is rotated and the second end portion of the armrest is supported to the supporting pin, the armrest is configured for mounting an arm of an occupant.

11. The door armrest structure of claim 10, wherein an upper surface of the armrest is disposed to be at a same surface as an external upper surface of an armrest seating portion of the door trim.

12. The door armrest structure of claim 11, wherein the armrest seating portion provides a rotation space for the armrest at a connection point of the armrest pivot and the armrest.

13. The door armrest structure of claim 12,
wherein the armrest seating portion includes a cutting portion, and
wherein when the armrest rotates and the second end portion of the armrest rotates in a direction away from the bottom surface of the vehicle body, the cutting portion of the armrest seating portion limits rotation of the armrest.

14. The door armrest structure of claim 1, wherein an end portion of the armrest is formed of a 'L' shape.

15. The door armrest structure of claim 1, wherein the drive motor is a cinching motor that assists in a locking of the door and rotation of the armrest.

16. The door armrest structure of claim 15, wherein the drive motor includes a latch driving cable and an armrest driving cable respectively connected to a latch provided on a hinge side of the door and the armrest pivot to transmit a driving torque to the latch and the armrest pivot.

* * * * *